Feb. 22, 1938.    F. W. BILLKER ET AL    2,109,057
CUTTING MACHINE
Original Filed March 29, 1935
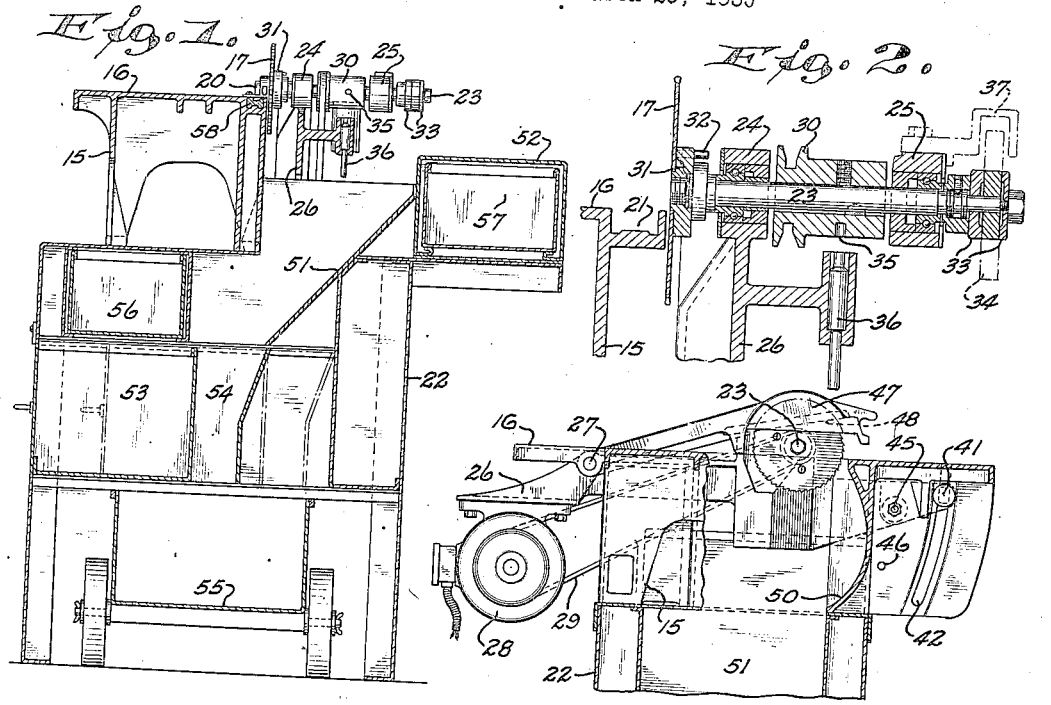
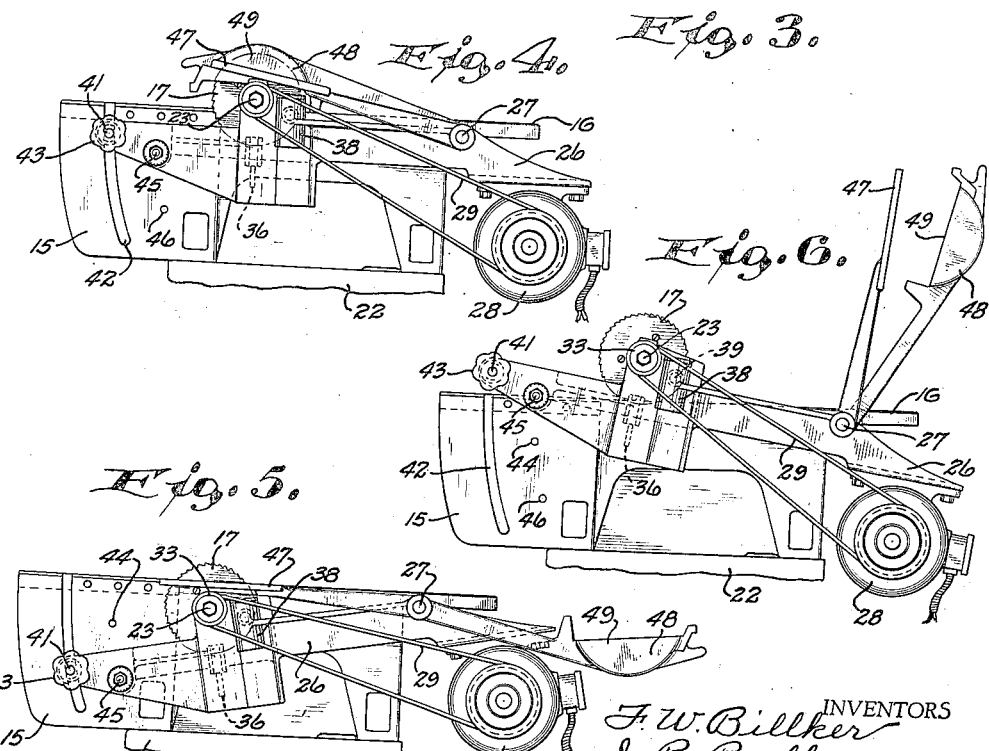
INVENTORS
F. W. Billker
J. B. Ball
Morsell, Lieber & Morsell
ATTORNEYS Patented Feb. 22, 1938

2,109,057

UNITED STATES PATENT OFFICE 2,109,057

CUTTING MACHINE

Fredrick W. Billker, Milwaukee, Wis., and John B. Ball, Chicago, Ill., assignors to Milwaukee Saw Trimmer Corporation, Milwaukee, Wis., a corporation of Wisconsin Original application March 29, 1935, Serial No. 13,604. Divided and this application May 21, 1936, Serial No. 81,014

15 Claims. (Cl. 29—69)

The present invention relates generally to improvements in the construction and operation of cutting machines of the class employed in the composing rooms of printing establishments for the purpose of cutting and trimming type bars, slugs, borders, plates, or other typographical stock.

Generally stated, an object of the invention is to provide improved cutting mechanism which is simple and durable in construction, and which is moreover highly efficient and flexible in use.

Another object of the invention is to provide improved structure for segregating and for distributing the cuttings from a typographer's saw or the like, so as to suit the desires of the operator.

A further object of the invention is to provide an improved supporting cabinet for cutting and trimming machines or the like, whereby the normal use of such machines is facilitated and the range of utility is enhanced.

Still another object of the invention is to produce an improved saw assemblage provided with simple means for obviating undesirable rebound of the cuttings.

An additional object of the invention is to provide improved mechanism for supporting and for counter-balancing the weight of the movable cutter of a type trimming machine.

Another object of the invention is to provide an improved cutting machine adapted for both normal trimming and undercutting, and wherein the cutter is quickly and readily removable from the driving shaft.

A further object of the invention is to provide improved saw guard and movable sub-table structure swingable about a common pivot, and improved means for retaining the saw guard in various positions.

Another object of the invention is to provide various other improvements in the details of construction of cutting machines, whereby the cost of construction and operation is reduced to a minimum, while the general utility thereof is enhanced to a maximum.

These and other objects and advantages will be apparent from the following detailed description:

The present application is a division of our co-pending application Serial No. 13,604, filed March 29, 1935.

A clear conception of embodiments of the several new features, and of the mode of constructing and of operating cutting machines built in accordance with the improvements, may be had by referring to the drawing accompanying and forming a part of this specification in which like reference characters designate the same or similar parts in the various views.

Fig. 1 is a vertical section through one of the improved cutting machines showing the cuttings distributing structure and the improved saw mounting;

Fig. 2 is an enlarged similar section through the saw supporting and driving structure, showing the dressing wheel and guard in dot-and-dash lines;

Fig. 3 is a fragmentary vertical irregular section through the machine, part of the section being taken through the work support remote from the saw, and another part of the section being taken in the plane of cutting;

Fig. 4 is a fragmentary side view of the machine, showing the saw in normal cutting position for slugs and the like;

Fig. 5 is a similar view of the machine, showing the saw adjusted to another cutting position for plates or the like, with the saw guard swung back; and Fig. 6 is another similar view of the machine, showing the saw positioned preparatory to removal thereof, with the saw guard and sub-table swung clear of the saw.

While the features of the improvement have been shown and described as being applied to a particular type of sawing and trimming machine, it is not intended to unnecessarily restrict the scope by such specific embodiment, since some of these features may obviously be susceptible of more general application.

Referring to the drawing, the improved cutting machine illustrated therein, comprises in general a stationary frame 15 having a main upper substantially horizontal work-supporting surface 16; a rotary cutter or saw 17 swingably supported by the frame 15 for movement through a slot therein, and cooperable with the work resting upon the surface 16; suitable instrumentalities, (not shown), for moving the work along the surface 16 past the saw 17; clamping mechanism 20 movable within a slot 21 in the frame 15 to insure simultaneous advancement of the work with the gage bar; and a cabinet 22 for supporting the main frame 15 and having structure therein for properly distributing the cuttings.

The main frame 15 is of sturdy construction and is permanently attached to the supporting cabinet 22 so as to permit handling of the interconnected elements, as a unit. The saw 17 is detachably secured to one end of a shaft 23 mounted in spaced bearings 24, 25 carried at the forward end of a swingable frame 26, the medial portion of which is suspended from the fixed frame 15 by a pivot 27, and the rear portion of which carries a propelling motor 28. The weight of the motor 28 thus tends to counter-balance the weight of the saw 17 and shaft 23, and the motor is drivingly connected to the shaft 23 by a belt 29 coacting with a pulley 30 secured to the shaft 23 between the bearings 24, 25. The saw 17 is detachably secured to a hub 31 which has screw thread coaction with the end of the shaft 23, and the saw hub is provided with trimmer knives 32, the clamping screw sockets of which are adapted to be engaged by a spanner wrench during removal of the saw. The end of the shaft 23 remote from the saw 17, may be provided with collars 33 adapted to clamp an emery-wheel 34 to the outer shaft end, and the pulley 30 is preferably provided with a series of holes 35 formed for reception of a slidable pin 36 carried by the saw frame 26 so that the shaft 23 may be locked against rotation while the saw 17 or the emery-wheel 34, are being applied or removed. The emery-wheel 34 may be provided with a removable guard 37 attached to the adjacent bearing 25, as shown in Figs. 1 and 2; and the saw frame 26 carries an integral oil reservoir 38 having therein a wick extending toward one face of the saw 17 for controlling the quantity of oil passing through the wick.

As previously stated, the saw 17 and frame 26 are swingable about the pivot 27, and in order to definitely position the saw 17 relative to the work-supporting surface 16, the forward portion of the frame 26 is provided with positioning and locking structure such as shown in Figs. 4, 5 and 6. The extreme forward end of the saw frame 26 carries a bolt 41 which is movable along an arcuate slot 42 formed in the main frame 15, and a hand nut 43 coacts with the bolt 41 so as to permit clamping of the frame 26 and resultant positioning of the saw 17 in any desired position relative to the surface 16. Since it is preferable during normal slug cutting, to have the central axis of the saw 17 in substantial alinement with the central horizontal plane of the work, the main frame 15 may be provided with a hole 44 which is engageable by a latch pin 45 carried by the forward portion of the frame 26 to positively lock the saw 17 in normal slug cutting position as shown in Fig. 4. This pin 45 is also engageable with a second hole 46 in the frame 26 to positively lock the saw 17 in plate cutting position, as shown in Fig. 5; and may also be swung to lower positions for undercutting to any depth, or the frame may be swung upwardly sufficiently to permit free removal and application of the saw 17. The work supporting table is also provided with a movable section 47 which is swingably supported upon the saw frame pivot 27 and is engageable with the bearings 24, 25 when the latter are raised, so as to open a gap for the discharge of slugs and cuttings from the surface 16, but when plates are being cut the top surface of the sub-table 47 lies flush with the surface 16. A saw guard 48 which is also swingably supported by the frame pivot 27, and which has a lower surface 49 adapted to rest upon the table section 47, encloses the upper portion of the saw 17 and is movable with the section 47 when the latter is elevated, but when the saw 17 is lowered sufficiently, the guard 48 rests upon the work supporting surface 16 through spacer projections.

The main frame 15 in advance of the saw 17, is provided with an integral rebound preventing curved surface 50 formed to prevent the chips and cuttings from bouncing back against the saw, and to direct these cuttings into a chute 51. The saw carrying frame 26 is also provided with a depending apron extending laterally and to the rear of the saw blade, for the purpose of also directing cuttings into the chute 51 regardless of the position of adjustment of the saw. The chute 51 may be part of the supporting cabinet 22 which may be provided with a galley-support 52 adjacent the upper end of the chute, and has concealed therein a combined drawer 53 and sub-chute 54 which are interchangeably cooperable with the lower discharge end of the main chute 51, see Fig. 1. The drawer 53 when positioned as shown in dot-and-dash lines in Fig. 1, is adapted to receive brass rule and other hard cuttings delivered from the saw 17 to the main chute 51, thereby preventing these harder cuttings from mixing with the soft metal cuttings. When the drawer 53 is positioned as shown in solid lines in Fig. 1, the slugs and soft metal cuttings are delivered to the sub-chute 54 which is adapted to deliver the soft metal into a waste-receiving box or car 55 disposed within the cabinet space beneath the drawer 53. The cabinet 22 may also be provided with a tool drawer 56 above the cuttings-receiving drawer 53 and laterally adjacent to the lower end of the main chute 51, and may also have another drawer 57 therein beneath the galley-rest 52.

During normal operation of the improved cutting machine, the saw 17 may be set in motion at the will of the operator, by manipulating a switch preferably disposed at the front of the machine. Depending upon the class of work being operated upon, the saw 17 may be adjusted to any desired position relative to the work supporting surface 16, by manipulation of the hand nut 43 and subsequent swinging of the frame 26 so as to bring the saw 17 in the desired position of adjustment. When the saw 17 is set in the position illustrated in Fig. 4, the pin 45 engages the hole 44 in the frame 15 and locks the saw support 26 in normal cutting position. When plates are to be trimmed, the support 26 may be swung to the position shown in Fig. 5 and locked in such position by the engagement of the pin 45 with the hole 46 in the frame. The hand nut 43, however, permits setting of the saw 17 in any intermediate position and also permits lowering of the saw for undercutting, and it will be noted that when the saw 17 is elevated as in Fig. 4, the table section 47 is also elevated to open a gap for discharge of slugs, and the saw guard 48 then moves with the table section 47. In order to effect removal of the saw 17, or of the emery wheel 34, the saw support may be elevated considerably beyond cutting position, whereupon the saw 17 may be readily removed by applying a spanner wrench to the trimmer socket while the saw shaft 23 is locked in position by the locking pin 36.

The counterbalancing of the weight of the saw 17 and the shaft 23 by the weight of the motor 28, permits convenient adjustment of the saw, and the mounting of the sub-table 47 and saw guard 48 on the pivot which supports the saw carrying frame, materially simplifies the structure. The cuttings are effectively removed from the zone of cutting by the chute 51 cooperating with the rebound preventing surface 50, and the drawer 53 with its auxiliary chute 54, permits rapid and effective distribution of the cuttings, in any desired manner. The galley rest 52 disposed at the receiving end of the chute 51, provides means for conveniently handling the work and for supporting the removed accessories which are associable with the machine, and the drawers 56, 57 provide storage space for tools and these removed accessories.

The saw 17 and the emery wheel 34 may be quickly removed from the shaft 23, and replaced by another, without undesirably dismantling the structure, and the improved cutting machine has proven highly successful and extremely flexible in actual commercial use.

It should be understood that it is not desired to limit the present invention to the exact details of construction and to the precise mode of operation herein shown and described, for various modifications within the scope of the claims may occur to persons skilled in the art.

It is claimed and desired to secure by Letters Patent:—

1. In a cutting machine, a cutter, a chute extending beneath and across the plane of action of said cutter, a cabinet supporting said cutter and said chute and having a confined space communicating with said chute, and an element movable in said space for effecting controlled distribution of the cuttings delivered from said chute either cumulatively upon said element or freely out of said space.

2. In a cutting machine, a cutter, a chute for directing cuttings away from said cutter, a cabinet supporting said cutter and said chute, and a drawer slidable with respect to the discharge end of said chute within said cabinet to interchangeably effect delivery of the cuttings either into said drawer or past the same and out of said cabinet.

3. In a cutting machine, a frame having a work supporting surface, a cutter associated with said frame near said surface, a cabinet for supporting said frame and having therein a chute for directing cuttings toward the central interior portion of the cabinet, and a drawer movable within said cabinet to a position in alinement with the discharge end of said chute, said cabinet having an opening communicating with the drawer space for effecting free external discharge of cuttings from said chute when said drawer is in a predetermined position.

4. In a cutting machine, a frame having a work supporting surface, a cutter associated with said frame near said surface, a cabinet for supporting said frame and having therein a chute for directing cuttings toward the central interior portion of the cabinet, and a drawer movable within said cabinet to a position in alinement with the discharge end of said chute, said drawer having an auxiliary chute movable therewith and interchangeably communicable with the discharge end of said first mentioned chute.

5. In a cutting machine, a frame having an upper work supporting surface, a cutter associated with said frame, a cabinet for supporting said frame and having therein a cuttings discharge chute, and a galley rest formed integral with said cabinet and disposed adjacent the inlet opening of said chute beneath and laterally remote from said surface.

6. In a cutting machine, a frame having an upper work supporting surface, a cutter movably supported by said frame near said surface, a support for said frame having a chute disposed beneath said cutter, and a galley rest formed integral with said frame support and having an upper work supporting surface disposed beneath said frame surface and laterally adjacent to the cuttings receiving end of said chute and at the side thereof remote from said cutter.

7. In a cutting machine, a frame having a work supporting surface, an elongated support having its medial portion pivotally attached to said frame, a rotary cutter journaled on said support in front of its attaching pivot, a driving motor for said cutter secured to said support rearwardly of said pivot, a guard for said cutter swingably mounted directly upon said pivot, and means for clamping said support to said frame in various positions so as to vary the position of said cutter relative to said surface.

8. In a cutting machine, a frame, an elongated support, a pivot connecting the medial portion of said support with said frame, a cutter carried by said support at one side of said pivot, propelling means for said cutter carried by said support at the opposite side of said pivot, and a guard for said cutter swingably mounted directly upon said support pivot.

9. In a cutting machine, a frame having a work supporting surface provided with a movable section, a support, a pivot connecting said support and said frame, a rotary cutter carried by said support remote from said pivot and being movable relative to said frame, and a guard for said cutter, both said guard and said movable frame section being swingably supported directly upon said support pivot.

10. In a cutting machine, a work supporting frame, an elongated support, a pivot connecting the medial portion of said support with said frame, a cutter journalled in said support at one side of said pivot, propelling means for said cutter carried by said support at the opposite side of said pivot, and a guard for said cutter suspended from said pivot and being swingable thereabout independently of said support.

11. In a cutting machine, a work supporting frame, an elongated support, a pivot connecting said support and said frame, a cutter journalled in said support remote from said pivot and being swingable relative to said frame, and a guard for said cutter suspended directly from said pivot and being swingable thereabout independently of said support.

12. In a cutting machine, a stationary frame, a pivot carried by said frame, a cutter support swingably suspended from said pivot, a cutter carried by said support, a guard for said cutter also swingably suspended from said pivot, and a table section likewise swingably suspended from said pivot, said cutter support and said guard and said table section being independently swingable relative to said frame.

13. In a cutting machine, a fixed work supporting frame, a cutter, a support for said cutter, a pivot connecting said support and said frame, a cutter guard suspended from said pivot, and a table section suspended from said pivot, said cutter support and said guard and said table section being independently swingable about said pivot and relative to said frame.

14. In a cutting machine, a frame, a cutter carried by said frame, a cabinet supporting said frame, and a drawer slidable within said cabinet beneath said cutter, said drawer having a chute and being operable to interchangeably effect delivery of cuttings either into the drawer or through said chute and out of said cabinet.

15. In a cutting machine, a work support, a cutter cooperating with said support, a cabinet supporting said work support and cutter, and an element slidable within said cabinet beneath said cutter, said element having a chute and being formed to interchangeably effect delivery of cuttings either cumulatively upon the element or freely through said chute and out of said cabinet.

FREDRICK W. BILLKER.
JOHN B. BALL.